United States Patent
Thomas et al.

(10) Patent No.: US 8,322,852 B2
(45) Date of Patent: *Dec. 4, 2012

(54) TINTED CONTACT LENS HAVING A DEPTH EFFECT

(75) Inventors: Scott K. Thomas, Jacksonville, FL (US); Christopher Wildsmith, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 91 days.

This patent is subject to a terminal disclaimer.

(21) Appl. No.: 12/899,485

(22) Filed: Oct. 6, 2010

(65) Prior Publication Data

US 2011/0019149 A1    Jan. 27, 2011

Related U.S. Application Data

(62) Division of application No. 11/759,452, filed on Jun. 7, 2007, now Pat. No. 7,832,860.

(51) Int. Cl.
*G02C 7/04* (2006.01)

(52) U.S. Cl. ............................................. 351/162

(58) Field of Classification Search ... 351/160 R–160 H, 351/159.24–159.32
See application file for complete search history.

(56) References Cited

U.S. PATENT DOCUMENTS

| | | | |
|---|---|---|---|
| 5,057,578 A | 10/1991 | Spinelli | |
| 5,314,960 A | 5/1994 | Spinelli et al. | |
| 5,371,147 A | 12/1994 | Spinelli et al. | |
| 5,910,375 A | 6/1999 | Parker et al. | |
| 6,315,410 B1 * | 11/2001 | Doshi | 351/162 |
| 7,832,860 B2 * | 11/2010 | Thomas et al. | 351/162 |
| 2002/0080327 A1 * | 6/2002 | Clark et al. | 351/162 |
| 2005/0218536 A1 | 10/2005 | Quinn | |

FOREIGN PATENT DOCUMENTS

| | | |
|---|---|---|
| EP | 0484044 B1 | 8/1995 |
| GB | 1163617 | 9/1969 |
| WO | WO 00/34805 | 6/2000 |

OTHER PUBLICATIONS

EP Exam Report Dated Oct. 10, 2011 for Application No. 08 769 738 .9-1253 Date of Mailing Oct. 24, 2011.

* cited by examiner

*Primary Examiner* — Darryl J Collins

(57) ABSTRACT

The invention provides tinted contact lenses that enhance or change the color of the lens wearer's iris. The lenses of the invention impart a three-dimensional appearance to the pattern by the use of alternating clear and color layers.

7 Claims, 1 Drawing Sheet

TINTED CONTACT LENS HAVING A DEPTH EFFECT

CROSS REFERENCE TO RELATED APPLICATION

This application is a divisional application of U.S. application Ser. No. 11/759,452 filed on Jun. 7, 2007, now U.S. Pat. No. 7,832,860 and claims priority thereto under 35 U.S.C. 121.

FIELD OF THE INVENTION

The invention relates to tinted contact lenses. In particular, the invention provides contact lenses that change or enhance the natural color of the lens wearer's iris.

BACKGROUND OF THE INVENTION

The use of tinted, or colored, contact lenses to alter or enhance the natural color of the iris is well known. In manufacturing conventional tinted lenses, it is known to use either or both translucent and opaque colors in one or more layers of color with the object of creating a natural appearing tinted iris. Typically, the color layers are each applied at a single thickness. This provides color variation only with the use of multiple color layers or points at which a translucent color layer overlaps another color layer. However, the natural iris is composed of a large number of different colors and color combinations intermixed to create color variations. The relatively small number of colors and color layers that may be used in producing tinted contact lenses limits the designer's ability to create a natural appearing lens.

Additionally, conventional tinted lenses are disadvantageous in that they lack the three-dimensional appearance of the natural iris. This results in a flat, unnatural appearance when the lens is worn on-eye.

DETAILED DESCRIPTION OF THE INVENTION AND PREFERRED EMBODIMENTS

The invention provides tinted contact lenses, and methods for their manufacture, that enhance or change the color of the lens wearer's iris. The lenses of the invention are manufactured to impart a three-dimensional appearance to the pattern providing depth to the pattern and a more natural appearance to the pattern when the lens is worn on-eye. It is a discovery of the invention that this can be achieved in a tinted lens by the use of alternating clear and color layers. The lenses of the invention will find utility as cosmetic lenses for either or both enhancing an individual's iris or changing the color of the iris.

In one embodiment, the invention provides at least one surface of a contact lens comprising at least two clears layers alternating with at least one color layer. In an alternative embodiment, the invention provides at least one surface of a contact lens comprising at least two color layers alternating with at least one clear layers.

By "clear layer" is meant a layer of material that is substantially devoid of any dye or pigment.

By "color layer" is meant a layer containing an area of opaque color, translucent color, or a combination thereof. By "translucent" is meant that the color permits an average light transmittance (% T) in the 380 to 780 nm range of greater than or equal to about 60, preferably greater than or equal to about 65 percent T. By "opaque" is meant that the color permits an average light transmittance (% T) in the 380 to 780 nm range of 0 to about 55, preferably 7 to about 50 percent T.

The clear and color layers may be applied to either the back, or eye side, surface or the front, or object side, surface of the lens, or combinations thereof. Preferably, all of the layers are on the front surface of the lens. In order to achieve the desired depth effect, the clear and color layers must be applied, or printed, in an alternating order. The layers may be applied directly to the surface of a contact lens or, and preferably, the layers are applied to the molding surface of a lens mold half after which the mold half is filled with lens material, a complementary mold half is used to complete the mold assembly, and the mold assembly is exposed to conditions suitable to cure the lens material used.

Figure 1:
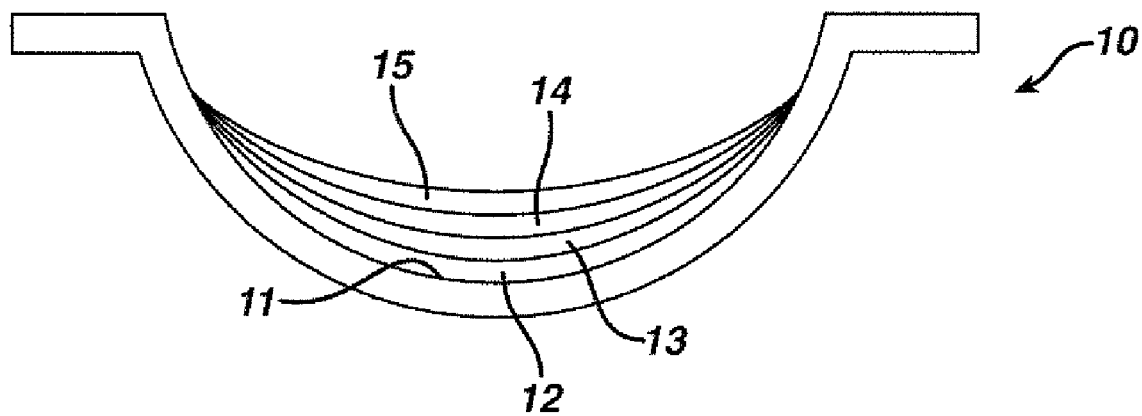
FIG. 1 is a cross-sectional view of a mold half useful in producing the lenses of the invention.
Figure 2:
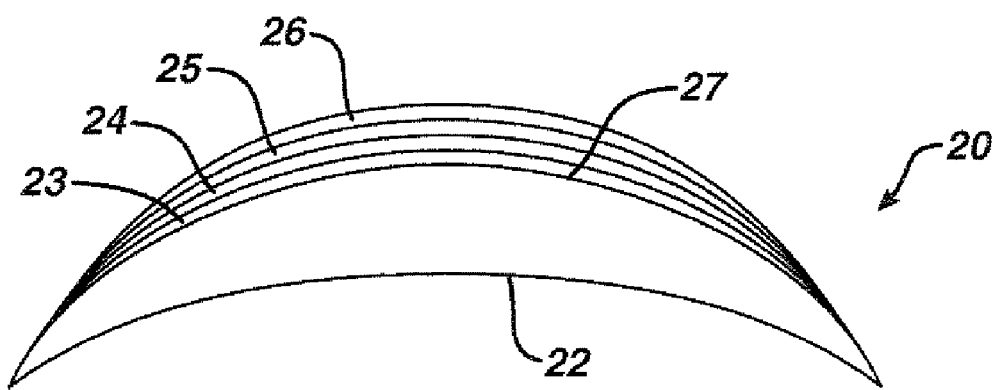
FIG. 2 is a cross-sectional view of a lens of the invention.

For example and with reference to FIG. 1, a cross-sectional view of a front curve mold half 10 for a contact lens is shown. Clear layer 12 is printed first onto the concave surface of the mold half, followed by the printing of colored layer 13. Clear layer 14 is printed onto color layer 13, followed by color layer 15 being printed onto clear layer 14. In FIG. 2 is depicted lens 20 of the invention having concave surface 22 and convex surface 27. On convex surface 27 is shown color layers 23 and 25 alternating with clear layers 24 and 26.

The thickness of each of the layers will depend upon one or more of the material used to form each layer, the method used for printing the layer, the design of the cliché used, and the design. The first clear layer preferably is between about 5 to about 15 μm thick and each color payer is preferably about 5 to about 15 μm thick, but may be as thick as 50 μm. It is most preferred that the color layers are each as thin as possible. Each subsequent clear layer other than the first clear layer preferably is thicker than the first clear layer and is about 5 to about 150 μm, more preferably about 5 to about 50 μm in thickness. The number of clear and color layers used will depend upon the thickness of each individual layer and the extent of the depth effect desired. Preferably, 2 clear layers and 2 color layers are used.

The entirety of each of the color layers may contain an opaque color, translucent color or a combination thereof. Alternatively, the color layer may have a clear, colorless central zone, that is preferably substantially circular in shape, surrounded by a color zone containing an opaque color, translucent color or a combination thereof. Preferably, the clear central zone is provided on the lens such that, when the lens is on-eye, the clear zone partially or wholly overlies the lens wearer's pupil and the color zone partially or wholly overlies one or both of the lens wearer's iris, and limbal ring. The clear layers preferably correspond to the size and shape of the adjacent color layer or layers. Each of the adjacent layers, whether a color layer or a clear layer, may cover all or only a portion of the surface, layer, or layers to which it is adjacent. For example, the layer may be printed on either only the optic zone or lenticular portion of the lens' surface. Preferably, each of the clear and color layers is positioned on the lens so that they both overlay one or both of the iris and limbal ring of the lens wearer when the lens is on-eye.

When the lenses of the invention are worn on-eye, greater than about 85%, preferably equal to or greater than about 90%, of the area of the iris alone is covered and about 0 to 100% of limbal ring is covered by the combination of the color zones of all of the color layers used. This is advantageous in that a color change or enhancement to the iris may be imparted without either blocking the natural iris structure or having an impact on visual performance while providing an appearance of depth within the pattern. Additionally, using the color layers of the invention, even the color of the darkest colored on irises may be changed.

Each of the clear and color layers used in the lenses of the invention are applied to, or printed on, the lens surface or on a lens molding surface of a mold half by any convenient method. In a preferred method, a thermoplastic optical mold, made from any suitable material including, without limitation, cyclic polyolefins and polyolefins such as polypropylene or polystyrene resin is used. The color and clears layers are alternately deposited onto the desired portion of the molding surface of the mold. By "molding surface" is meant the surface of a mold or mold half used to form a surface of a lens. The deposition preferably is carried out so that the outermost color layer on the lens surface will be a clear layer. Preferably, the deposition is carried out by pad printing as follows.

A metal plate, preferably made from steel and more preferably from stainless steel, is covered with a photo resist material that is capable of becoming water insoluble once cured. The pattern of the color layer is selected or designed and then reduced to the desired size using any of a number of techniques such as photographic techniques, placed over the metal plate, and the photo resist material is cured.

Following the pattern, the plate is subsequently washed with an aqueous solution and the resulting image is etched into the plate to a suitable depth, for example about 20 microns. A colorant containing a binding polymer, solvent, and pigment or dye is then deposited onto the pattern to fill the depressions with colorant. A silicon pad of a geometry suitable for use in printing on the surface and varying hardness, generally about 1 to about 10, is pressed against the image on the plate to remove the colorant and the colorant is then dried slightly by evaporation of the solvent. The pad is then pressed against the molding surface of an optical mold. The mold is degassed for up to 12 hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

Each clear layer may be a layer of pre-polymer, monomer, or polymer. Preferably, each clear layer is a layer of pre-polymer, which pre-polymer layer overlays at least a portion of the adjacent color layer and preferably overlays the entirety of the color layer. The pre-polymer, monomer, or polymer selected may be any that is capable of dispersing the pigment and any opacifying agent used.

The color selected to be used in each of the color layers will be determined by the natural color of the lens wearer's iris and the color to which the natural color is to be changed or the degree to which the natural color is to be enhanced. Thus, the color may be any color including, without limitation, any of a variety of hues and chromas of white, black, blue, green, gray, brown, yellow, red, or combinations thereof.

The invention may be used to provide tinted hard or soft contact lenses made of any known lens-forming material, or material suitable for manufacturing such lenses. Preferably, the lenses of the invention are soft contact lenses the material selected for forming the lenses of the invention being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, made of monomers containing hydroxy groups, carboxyl groups, or both or be made from silicone-containing polymers, such as siloxanes, hydrogels, silicone hydrogels, and combinations thereof. Materials for making soft contact lenses are well known and commercially available. Preferably, the material is acquafilcon, etafilcon, genfilcon, or lenefilcon.

The color zones, may be made from any organic or inorganic pigment suitable for use in contact lenses, or combinations of such pigments. The opacity may be controlled by varying the concentration of the pigment and titanium dioxide used, with higher amounts yielding greater opacity. Illustrative organic pigments include, without limitation, phthalocyanine blue, phthalocyanine green, carbazole violet, vat orange # 1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

The dye or pigment selected may be combined with one or more of a prepolymer, or binding polymer, and a solvent to form the colorant used to produce the translucent and opaque color layers used in the lenses of the invention. The prepolymer may be any polymer that is capable of dispersing the pigment and any opacifying agent used. Other additives useful in contact lens colorants also may be used. The binding polymers, solvents, and other additives useful in the color layers of the invention are known and either commercially available or methods for their making are known.

The color zones of the color layer or layers may be uniform or have a radially gradient appearance meaning that either the color density varies or the size, density, and placement of colored shapes within the zone vary such that a radially gradient effect is produced. The uniform color zones may include clear shapes, the shapes including, without limitation, circles, ovals, triangles, lines, striae, featherlike shapes, and the like, and combinations thereof. Alternatively, the color zone may be composed of opaquely colored shapes, such as those listed. The number, size, and shapes used will be determined by the desired effect to be achieved by the lens. The color zone additionally may contain a pattern of a plurality of intermittent opaque shapes to aid in imparting additional depth to the resulting image.

We claim:

1. A contact lens, comprising at least two clears layers alternating with at least one color layer and having a radially gradient appearance wherein each of the clear layers is of a thickness of about 5 to about 150 μm and each color layer is of a thickness of about 5 to about 15 μm and wherein the color layer is applied to an area of the lens substantially corresponding to or within the area covering the wearer's iris when worn on eye.

2. The contact lens of claim 1, wherein each of the color layers comprise a clear, colorless central zone and a color zone.

3. The contact lens of claim 2, wherein the central zone is substantially circular and the color zone is an annular zone surrounding the central zone.

4. A contact lens, comprising at least two color layers alternating with at least one clear layer and having a radially gradient appearance wherein each of the clear layers is of a thickness of about 5 to about 150 μm and each color layer is of a thickness of about 5 to about 15 μm and wherein the color layer is applied to an area of the lens substantially corresponding to or within the area covering the wearer's iris when worn on eye.

5. The contact lens of claim 4, wherein each of the color layers comprise a clear, colorless central zone and a color zone.

6. The contact lens of claim 5, wherein the central zone is substantially circular and the color zone is an annular zone surrounding the central zone.

7. A method of providing a tinted contact lens, comprising the step of providing at least two clears layers alternating with at least one color layer in the lens and a radially gradient appearance wherein each of the clear layers is of a thickness of about 5 to about 150 μm and each color layer is of a thickness of about 5 to about 15 μm and wherein the color layer is applied to an area of the lens substantially corresponding to or within the area covering the wearer's iris when worn on eye.

\* \* \* \* \*